3,787,379
COPOLYMERS OF VINYL FLUORIDE AND HEXAFLUOROPROPENE
Richard Anthony Ferren, Ambler, and Daniel Ashton Dimmig, King of Prussia, Pa., assignors to Pennwalt Corporation, Philadelphia, Pa.
No Drawing. Filed Oct. 5, 1971, Ser. No. 186,806
Int. Cl. C08f 15/06
U.S. Cl. 260—87.5 A                    6 Claims

ABSTRACT OF THE DISCLOSURE

High molecular weight, heat stable, easily processable copolymers of vinyl fluoride and hexafluoropropene containing from 2 to 10 mole percent of polymerized units of hexafluoropropene are prepared by polymerizing the comonomers at pressures below 7000 p.s.i. in a reaction medium comprised of perfluoroalkane or perfluorochloroalkane solvent, or a mixture thereof with water, containing an effective amount of polymerization initiator having a ten-hour half life at a temperature between 0 and 50 C., within which range the polymerization is carried out.

---

This invention concerns novel, thermally-stable copolymers of vinyl fluoride and hexafluoropropene. More particularly, this invention concerns a high molecular weight copolymer of vinyl fluoride (VF) and hexafluoropropene (HFP) containing from 2 to 10 mole percent HFP obtained by carrying out the polymerization of the comonomers at moderate temperatures and low pressures in a reaction medium containing significant amounts of perfluoroalkane or perfluorochloroalkane solvent, the polymerization reaction initiated by an appropriate free-radical initiator.

Vinyl fluoride homopolymer is a commercially available resin used primarily as a coating because of its good chemical and ultraviolet light resistance (weatherability). However, the primary disadvantages of the vinyl fluoride polymer is its thermal instability when subjected to the elevated temperatures required for melt processing. Vinyl fluoride homopolymer has a melting point of about 210° C. but degrades rapidly at 215 to 225° C. with the evolution of hydrogen fluoride. Certain stabilizers added to the polymer overcome this problem to some extent but such additives are expensive and inconvenient, and also alter the good properties of the polymer.

It has now been discovered that a high molecular weight copolymer of vinyl fluoride (VF) and hexafluoropropene (HFP) containing from 2 to 10 mole percent of polymerized HFP units, and preferably from 2 to 5 mole percent HFP, which is produced according to the process embodied herein, has outstanding thermal stability and melt processability, eliminating the need for special fabrication techniques or the addition of stabilizer to minimize thermal degradation.

The copolymers of this invention are produced by polymerizing the measured amount of comonomers (to afford the desired copolymer constituency) in admixture in the liquid reaction medium comprised of perfluoroalkane or perfluorochloroalkane, or a mixture thereof with water, at temperatures within the range of about 0 to 50° C., preferably 20–40° C., said medium containing an effective amount of free-radical initiator having a ten-hour half life within said temperature range. The proportion of liquid reaction medium to monomers may range from 1:1 to 10:1 (weight ratio), and the proportion of water to perhaloalkane solvent may range from 0 to 4:1. Representative halogenated solvents for use herein are, for example, trifluorotrichloroethane ($CCl_2FCClF_2$), tetrafluorodichloroethane ($CClF_2CClF_2$), difluorotetrachloroethane ($CCl_2FCCl_2F$), fluorotrichloromethane ($CCl_3F$), perfluorocyclobutane ($C_4F_8$), and perfluoro-1,3-dimethylcyclobutane ($C_6F_{12}$).

The reason why the halogenated solvent in the reaction medium encourages the preparation of a higher quality VF/HFP copolymer is not established. However, it is known that the haloalkane serves as a solvent for the monomers prior to their conversion to copolymer and also serves as a solvent for the free radical initiator which, in the preferred embodiments, is charged to the polymerization reactor in solution in a portion of the haloalkane. The amount of initiator used in the process may range from about 0.005 to 5%, based on the weight of the monomers, preferably in the range of about 0.1 to 2 weight percent. Representative of suitable initiators having a ten-hour half life between 0 and 50° C., the temperature of the polymerization, are dialkyl peroxydicarbonates and acyl peroxides, e.g., diisopropyl peroxydicarbonate (ten-hour half life at 46° C.), di(sec-butyl)peroxydicarbonate (45° C.), di(2-ethylhexyl)peroxydicarbonate (42° C.), isobutyryl peroxide (34° C.), 2-methylpentanoyl peroxide (28° C.), perfluoropropionyl peroxide (30° C.) and di(perfluoro - 7 - methyloctanoyl)peroxide. Polymerizations carried out below 0° C. are, because of extended reaction times required, prohibitively uneconomical, while polymerization above 50° C. yields copolymers of lower molecular weight with inferior properties compared to polymers prepared in the temperature range of this invention.

A highly significant advantage of the process embodied herein is that of using a low pressure polymerization system, i.e., the autogenous pressures available from the gaseous VF storage container. Pressures employed are less than 700 p.s.i., generally on the order of 25–600 p.s.i., and preferably in the range of 100–400 p.s.i., in contrast to the extremely high pressures used heretofore in vinyl fluoride polymerizations, e.g. 2000 to 6000 p.s.i., such as described in U.S. Pat. 3,437,648, thereby eliminating the need for expensive high pressure equipment, including sophisticated high pressure pumps.

The polymerization reaction carried out under the conditions of this invention normally requires on the order of from about 2 to 20 hours to obtain yields of polymer, based on monomer charged, of 50% and upwards. Following the completion of the reaction and depressuring of the reactor, the solid, granular copolymer product is recovered by filtration, washed with a mixture of water and an organic liquid, e.g., methanol or acetone, and dried by well-known techniques.

The efficiency of the polymerization system used to make the copolymer of this invention is demonstrated by the fact that proportions of polymerized units of vinyl fluoride and hexafluoropropene in the copolymer essentially correspond to the proportions of the comonomers charged to the reactor system. This phenomenon has the advantage of permitting the feed of a constant composition of the two monomers throughout the polymerization. The polymerization can be carried out by a batch process with total feed of the gas mixture at the start of the run or by a continuous process in which a monomer mixture of constant composition is fed throughout the polymerization either as a mixture or as separate gas feeds to the reactor.

The VF/HFP copolymers produced according to this invention are easily melt processed and therefore particularly useful for molding and extrusion into items for the chemical process industries (gears, pump linings, pipe, electrical connectors) and for extrusion into tough and flexible films which are useful for coating metals such as steel and aluminum, and other substrates such as wood. The ease of processing of the copolymer in melt fabrication is partially a function of its molecular weight, which is gauged by a value known as the "plastic number", an empirical index related to melt flow. The plasticity number is the area in square millimeters of a plaque made by placing 0.5 gram of polymer powder in a cone between the aluminum sheet-covered platens of a Carver press heated to 200° C. The platens are brought together to compress the powder under slight pressure (less than 50 p.s.i.) for 30 seconds to melt the polymer and then the pressure is raised to 2500 p.s.i. for 60 seconds, after which the aluminum sheets are quickly removed from the press and rinsed with water. The area of the circular film of polymer is measured and reported as the plasticity number in mm.$^2$, which value is inversely proportional to the molecular weight, i.e., the greater the area of the polymer plaques produced, the lower the molecular weight of the polymer, and conversely. The VF/HFP copolymers of this invention will have plasticity numbers within the range of about 1100 to about 4200, preferably about 1400 to 3500.

The following representative examples will serve to clarify the invention as well as to point out the unexpected advantages achieved compared to polymerizations under conditions not falling within the ambit of the claims.

EXAMPLE 1

A 300 ml. stainless steel autoclave is cooled in a Dry Ice-acetone bath and charged with 100 ml. 1,1,2-trichloro-1,2,2-trifluoroethane, 0.5 gm. diisopropyl peroxydicarbonate, 9.5 grams hexafluoropropene and 52 grams vinyl fluoride. The autoclave is shaken horizontally at 24–26° C. for 18 hours with a maximum pressure in the reaction of 200 p.s.i.g.

The 95.7 mole percent vinyl fluoride —4.3 mole percent hexafluoropropene copolymer product (42.9 grams) is recovered by filtration, washed with water and methanol and dried at 80–100° C. The copolymer has a plasticity number (at 200° C.) of 2100 mm.$^2$ and a melting point of 178° C. Compression-molded (at 200° C.) films, 30 to 40 mils thick, are transparent, flexible and tough.

The excellent heat stability of the copolymer is demonstrated by high-temperature aging tests in air ovens performed on said molded film specimens as summarized in the following table (homopolymers of vinyl fluoride are not included for comparison because films thereof could not be made due to thermal degradation when attempts are made to prepare same by compression-molding).

| Sample number: | Oven temp., ° C. | Exposure time, hours | Tensile strength (break) after exposure, p.s.i. | Elongation after exposure, percent | Appearance of film |
|---|---|---|---|---|---|
| 1 | Control | 0 | 4,430 | 270 | Transparent flexible. |
| 2 | 125 | 24 | 4,860 | 300 | Transparent, flexible; negligible color. |
| 3 | 150 | 24 | 4,100 | 240 | Light yellow, flexible. |
| 4 | 175 | 24 | 3,970 | 170 | Amber, still very flexible. |

EXAMPLE 2

Following the procedure of the previous example, a mixture of 89 grams vinyl fluoride and 17 grams hexafluoropropene is polymerized in 100 ml. trichlorotrifluoroethane containing 0.45 gram diisobutyryl peroxide initiator, at 25° C. for five hours, maximum reaction pressure 260 p.s.i.g. to yield 67.5 grams of copolymer containing 5.3 mole percent polymerized hexafluoropropene units, and having a melting point of 172° C. and a plasticity number (at 200° C.) of 2100 mm.$^2$. Compression molded films 30–40 mils thick are transparent, flexible and tough. Thermal aging of the copolymer films in the air for 24 hours at an oven temperature of 150° C. causes only minor reduction in tensile strength.

EXAMPLE 3

770 grams vinyl fluoride and 131 grams hexafluoropropene are copolymerized at 26° C. for 30 hours, maximum pressure 190 p.s.i.g., in a medium comprised of a mixture of 1700 ml. deoxygenated water and 1300 ml. trichlorotrifluoroethane, containing 3 grams diisopropyl peroxydicarbonate initiator to yield 426 grams copolymer containing 3.9 moles of polymerized HFP units, and having a melting point of 184° C. and plasticity number of 2400 mm.$^2$. Compression-molded films (200° C.), 30–40 mils thick, are transparent, flexible and tough. Heat aging of the copolymer films at 150° C. in an air oven for 24 hours does not materially affect the physical properties, as shown by a minor change in tensile strength, confirming the good thermal stability of the copolymers of this invention.

EXAMPLE 4

VF/HFP copolymers prepared according to the techniques of the previous examples containing, respectively, 3.2 mole percent HFP, 5.1% HFP and 9.3% HFP, and having plasticity numbers, respectively, of 2400, 2000 and 3300 mm.$^2$, also showed good thermal stability when subjected to the foregoing oven-aging test. However, a similarly prepared vinyl fluoride homopolymer, plasticity number of 3400 mm.$^2$, melting point, 206° C., exhibited poor thermal stability as evidenced by the formation of a black, discontinuous film when attempting to compression-mold at 220° C. The homopolymer also was deficient in mechanical properties, e.g. low tensile strength, low elongation and low impact strength.

A similarly prepared vinyl fluoride-hexafluoropropene copolymer containing a greater amount of HFP (15 mole percent) was unsatisfactory and compared unfavorably to the copolymers of this invention containing lesser amounts of polymerized HFP units with regard to the following properties: low melting point, poor mechanical strength and poor dimensional stability.

EXAMPLE 5

Various VF/HFP copolymers are synthesized using conditions and/or initiators not falling within the scope of the appended claims. The copolymers so produced are found to be deficient in certain properties, e.g., heat stability, flexibility and molecular weight as described below:

41 grams of vinyl fluoride and 6 grams of hexafluoropropene are polymerized at 120° C. for 18 hours, maximum pressure 860 p.s.i.g., reaction initiated by 0.5 gram of di-tert-butyl peroxide. The copolymer product (43.8 grams) contains 3.6 mole percent polymerized HFP units. However, the molecular weight is undesirably low, the plasticity number being 10,000 mm.$^2$. In addition, compression-molded films are quite brittle.

44 grams of vinyl fluoride and 7 grams of hexafluoropropene are copolymerized in the presence of 0.5 g. di-tert-butyl peroxide in 100 ml. trichlorotrifluoroethane at 80° C. for 18 hours, maximum pressure 450 p.s.i.g., to yield 12 grams of copolymer containing 3.4 mole percent polymerized HFP units. The product is of low molecular weight with a plasticity number greater than 12,000 mm.$^2$, compression-molded films thereof also being brittle.

75 grams of vinyl fluoride and 14 grams of hexafluoropropene are copolymerized in 100 ml. of trichlorotrifluoroethane, initiated by the addition of 0.5 gram diisopropyl peroxycarbonate. However, the polymerization temperature is generally high, being at 35° C. for 4 hours, followed by reaction at 65° C. for an additional 14 hours, maximum pressure 620 p.s.i.g. 46.6 grams of copolymer containing 4.2 mole percent HFP is recovered having a plasticity number of 4800 mm.². However, compression molded 30 mil films are brittle and unsatisfactory.

50 grams of vinyl fluoride is copolymerized with 9 grams hexafluoropropene in 100 ml. trichlorotrifluoroethane initiated by 0.5 grams diisopropyl peroxydicarbonate. Reaction temperature is 60° C. for 18 hours and maximum pressure 550 p.s.i.g.; 38.3 grams of copolymer containing 3.8 mole percent HFP is recovered. The plasticity number is greater than 11,000 mm.² and meltpressed films are very brittle.

We claim:

1. A process for producing a high molecular weight, heat-stable easily processable copolymer of vinyl fluoride and hexafluoropropene characterized by being formable into transparent, flexible, tough film, said copolymer containing from 2 to 10 mole percent polymerized units of hexafluoropropene, which comprises copolymerizing said monomers at a pressure below 700 p.s.i. and at a temperature within the range of about 0° to 50° C., in a reaction medium comprised of perfluoroalkane or perfluorochloroalkane solvent, or a mixture thereof with water, said medium containing an effective amount of dialkyl peroxydicarbonate or acyl peroxide polymerization initiator having a ten-hour half life at a temperature within the range of 0° to 50° C.

2. A process according to claim 1 in which the hexafluoropropene content of the copolymer is 2 to 5 mole percent.

3. A process according to claim 1 wherein the polymerization temperature is from 20 to 40° C.

4. A process according to claim 1 wherein the polymerization pressure is from 100–400 p.s.i.

5. A process according to claim 1 in which the reaction medium contains the solvent $CCl_2FCClF_2$.

6. A process according to claim 1 wherein the polymerization initiator is diisopropyl peroxydicarbonate.

References Cited
UNITED STATES PATENTS

| | | | |
|---|---|---|---|
| 3,513,116 | 5/1970 | Sianesi et al. | 260—87.5 A |
| 2,549,935 | 4/1951 | Sauer | 260—87.5 A |
| 2,952,669 | 9/1960 | Bro | 260—87.5 A |
| 3,528,954 | 9/1970 | Carlson | 260—87.5 A |

HARRY WONG, JR., Primary Examiner

U.S. Cl. X.R.

117—128.4, 148, 161